United States Patent
Montenegro et al.

(10) Patent No.: US 7,401,215 B2
(45) Date of Patent: Jul. 15, 2008

(54) METHOD AND APPARATUS FOR FACILITATING CRYPTOGRAPHIC LAYERING ENFORCEMENT

(75) Inventors: Gabriel E. Montenegro, Meylan (FR); Julien H. Laganier, Saint Martin de Clelles (FR)

(73) Assignee: Sun Microsystems, Inc., Santa Clara, CA (US)

( * ) Notice: Subject to any disclaimer, the term of this patent is extended or adjusted under 35 U.S.C. 154(b) by 855 days.

(21) Appl. No.: 10/674,938

(22) Filed: Sep. 29, 2003

(65) Prior Publication Data

US 2005/0071627 A1    Mar. 31, 2005

(51) Int. Cl.
*H04L 9/00* (2006.01)
*H04L 9/32* (2006.01)

(52) U.S. Cl. ...................... 713/151; 713/190
(58) Field of Classification Search ........ None
See application file for complete search history.

(56) References Cited

U.S. PATENT DOCUMENTS

| | | | | |
|---|---|---|---|---|
| 6,101,543 A * | 8/2000 | Alden et al. | ............ | 709/229 |
| 6,804,776 B1 * | 10/2004 | Lothberg et al. | ............ | 713/160 |
| 2004/0008845 A1 | 1/2004 | Le et al. | ............ | 380/227 |
| 2004/0010683 A1 * | 1/2004 | Huitema | ............ | 713/162 |
| 2004/0128376 A1 | 7/2004 | Matsune et al. | ............ | 709/223 |
| 2004/0193875 A1 | 9/2004 | Aura | ............ | 713/162 |
| 2004/0193876 A1 * | 9/2004 | Donley et al. | ............ | 713/162 |

OTHER PUBLICATIONS

Publication entitled "Secure Bootstrapping and Routing in an IPV6-Based Ad Hoc Network", by Yu-Chee Tseng et al., IEEE, Proceedings of the 2003 International Conference on Parallel Processing Workshops (ICPPW'03), WiSe '02, Sep. 28, 2002, Atlanta, Georgia.
Publication entitled "Securing IPV6 Neighbor and Router Discovery", by Jari Arkko et al., WiSe '02, Sep. 28, 2002, Atlanta, Georgia.

* cited by examiner

*Primary Examiner*—Gilberto Barron, Jr.
*Assistant Examiner*—Laurel Lashley
(74) *Attorney, Agent, or Firm*—Park, Vaughan & Fleming LLP

(57) ABSTRACT

One embodiment of the present invention provides a system that communicates cryptographic data through multiple network layers. During operation, the system receives the cryptographic data and divides the cryptographic data into multiple pieces. The system then encapsulates different pieces of the cryptographic data into fields associated with different network layers in a data packet, whereby an item of cryptographic data that is too large to be communicated in a single field can be communicated through multiple fields associated with different network layers.

36 Claims, 7 Drawing Sheets

METHOD AND APPARATUS FOR FACILITATING CRYPTOGRAPHIC LAYERING ENFORCEMENT

BACKGROUND

1. Field of the Invention

The present invention relates to techniques for heightening security in communication protocols. More specifically, the present invention relates to a method and an apparatus for increasing network security by encapsulating cryptographic information across different network layers.

2. Related Art

The explosive growth of the Internet has led to a proliferation of networked devices over the past few years. Due to a large increase in the number of networked devices, the Internet Protocol version 4 (IPv4) address space, which is based on a 32-bit long address format, will soon run out of usable addresses. To solve this problem, Internet Protocol version 6 (IPv6) was proposed. IPv6 defines a 128-bit long address format, which is believed to provide a sufficient number of addresses to accommodate all networked devices. These networked devices can include cell phones, personal data assistants (PDAs), and other computing devices.

Unfortunately, when IPv6 was designed many years ago, it was difficult to foresee the wide deployment of wireless networks that are being used today. Hence, the IPv6 mechanisms that manage local links were designed with physically protected, trustworthy links in mind. Today, people are planning to use IPv6 on public wireless networks, such as Wireless LANs (WLANs) in airports, hotels, etc. In such networks, even though an actual link may be somewhat protected with layer two (data link layer) authentication, access control, and encryption, some of the nodes on the link could still be untrustworthy. Furthermore, it is easy to set up a non-authentic WLAN base station that can be used to launch various types of attacks, such as access stealing, Denial-of-Service (DoS) attacks, and traffic-snooping attacks.

To address these security problems in IPv6, a Cryptographically Generated Address (CGA) can be used. In essence, a CGA allows a node to use a short but secure expression of its public key (for example, a part of a secure hash of the public key) as part of its IPv6 address. This CGA mechanism actually allows a node to prove that it has the authorization to use a particular address. This simple but powerful concept has far-ranging implications and applications to network security, reaching beyond IPv6 networks.

A similar concept is that of a "Hash Based Address" (HBA). It also uses a secure hash (e.g., SHA-1); but instead of a public key, the input to the secure hash function is a static identifier. Accordingly, an HBA alone cannot prove that its owner is the sole entity authorized to perform certain operations on the address. Nevertheless, they do have the non-reversible property of the secure hash function. Hence, they can be used to prove that an HBA is a special type of address, one that is derived securely from certain (perhaps public) parameters. This property of safely distinguishing addresses, between those that have the HBA property and those that do not, is quite useful to prevent certain types of attacks.

Both the CGA and HBA proposals define ways to derive IPv6 addresses. However, both of the above suffer from the limitation that an IPv6 address (more specifically, the interface-identifier part of an IPv6 address) leaves only 62 bits available for the hash value. In order to derive the security properties of CGA/HBA schemes, enough bits are required so that the uniqueness properties of the secure hash are maintained. The secure hash function SHA-1 produces 160 bits, but with the limitation of IPv6 addresses (and other CGA/HBA applications), the output must be truncated and not all 160 bits can be used.

Nevertheless, it is generally acknowledged that 128 bits and even fewer bits (approximately 100 bits) are more than enough for protection against attackers trying to find collisions on the secure hash by brutal force.

However, in the case of CGA/HBA, people increasingly question whether 62 bits are enough.

There have been some efforts to work within the 62-bit limitation by trading off increased protection with increased work load when generating the addresses. This is not nearly as practical as being able to keep more bits from the output of the secure hash function.

Hence, what is needed is a method and an apparatus that allows more bits to be used with the CGA and HBA techniques.

SUMMARY

One embodiment of the present invention provides a system that communicates cryptographic data through multiple network layers. During operation, the system receives the cryptographic data and divides the cryptographic data into multiple pieces. The system then encapsulates different pieces of the cryptographic data into fields associated with different network layers in a data packet, whereby an item of cryptographic data that is too large to be communicated in a single field can be communicated through multiple fields associated with different network layers.

In a variation of this embodiment, receiving the cryptographic data involves performing a non-reversible function on input data to produce the cryptographic data.

In a further variation, the input data includes a public key associated with the node.

In a further variation, the input data includes a static identifier associated with the node.

In a further variation, an IPv6 address field of the data packet is comprised of a 64-bit prefix followed by the most-significant 64 bits of the output of the non-reversible function, wherein a universal/local bit and an individual/group bit of the IPv6 address are both set to "0".

In a further variation, an SSH public-key fingerprint field of the data packet is comprised of the least-significant 128 bits of the output of the non-reversible function.

In a further variation, a MAC address field of the data packet is comprised of the least-significant 64 bits of the output of the non-reversible function.

In a further variation, a JXTA Peer-ID field of the data packet is comprised of the least-significant 128 bits of the output of the non-reversible function.

In a further variation, a JXTA Group-ID field of the data packet is comprised of the least-significant 128 bits of the output of the non-reversible function.

In a further variation, a SIP Call-ID field of the data packet is comprised of a local-id and a host address, wherein the local-id is comprised of the least-significant 128 bits of the output of the non-reversible function; and wherein the host address is comprised of the IPv6 address.

One embodiment of the present invention provides a system that verifies a data packet containing cryptographic data. Upon receiving the data packet, the system extracts pieces of cryptographic data from fields associated with different network layers within the data packet. The system then verifies that each piece of extracted cryptographic data matches with a corresponding portion of a piece of previously obtained cryptographic data.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

ISO/OSI Network Layer Model

Figure 1:
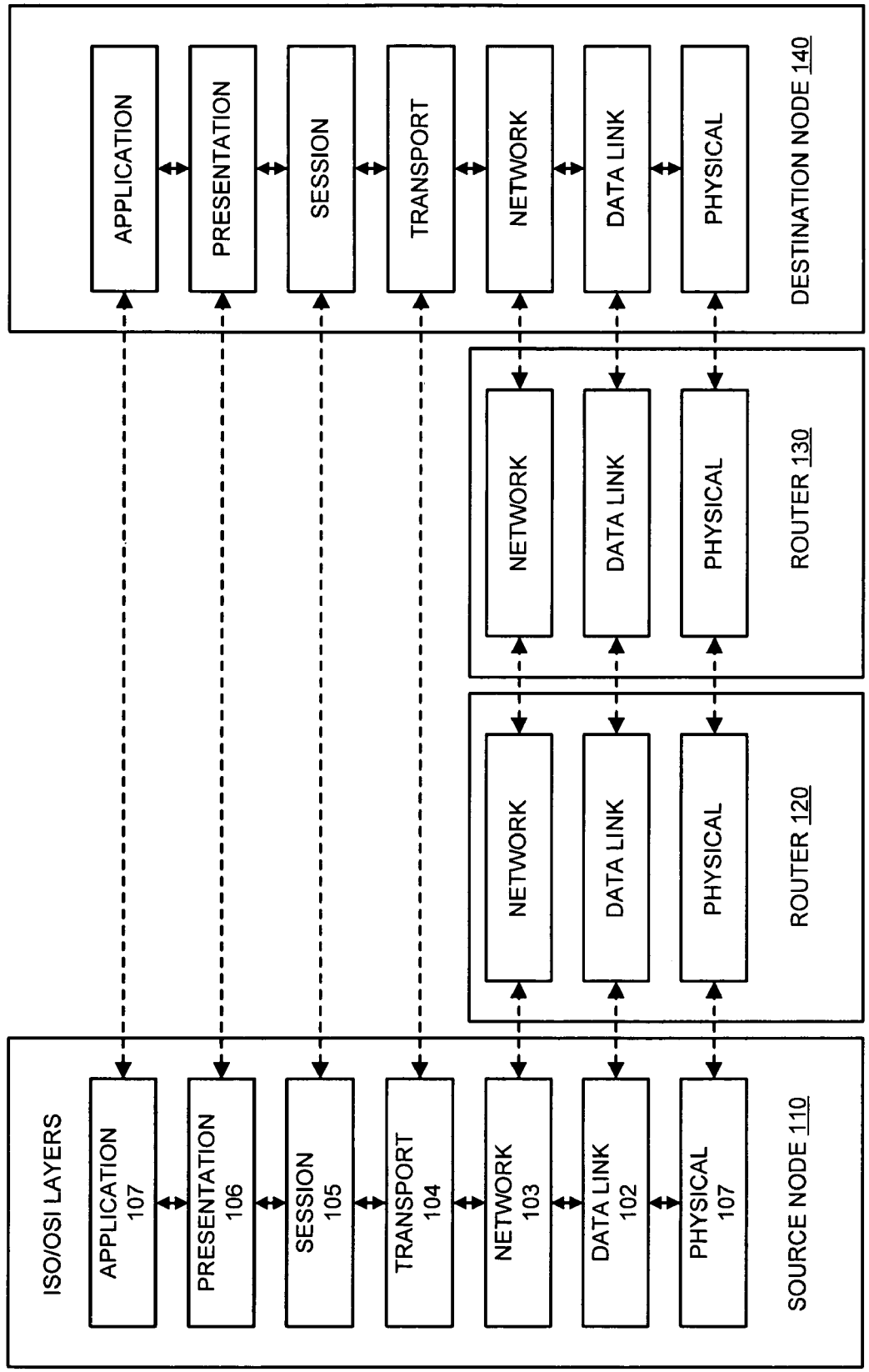
FIG. 1 illustrates the Open System Interconnect (OSI) network-layer reference model defined by the International Standards Organization (ISO).

FIG. 1 illustrates the Open System Interconnect (OSI) network-layer reference model defined by the International Standards Organization (OSI). In an end-to-end data-delivery path, there are a source node 110, a destination node 140, and typically a number of intermediate routing nodes (routers 120 and 130 in this example). Theoretically, the communication protocol stack of a node is comprised of seven layers: a physical layer (101), a data-link layer (102), a network layer (103), a transport layer (104), a session layer (105), a presentation layer (106), and an application layer (107). A data packet transmitted across a network typically includes fields corresponding to at least one of the OSI layers that carry certain address or identification information.

Crypto-Based Identifier

Figure 2:
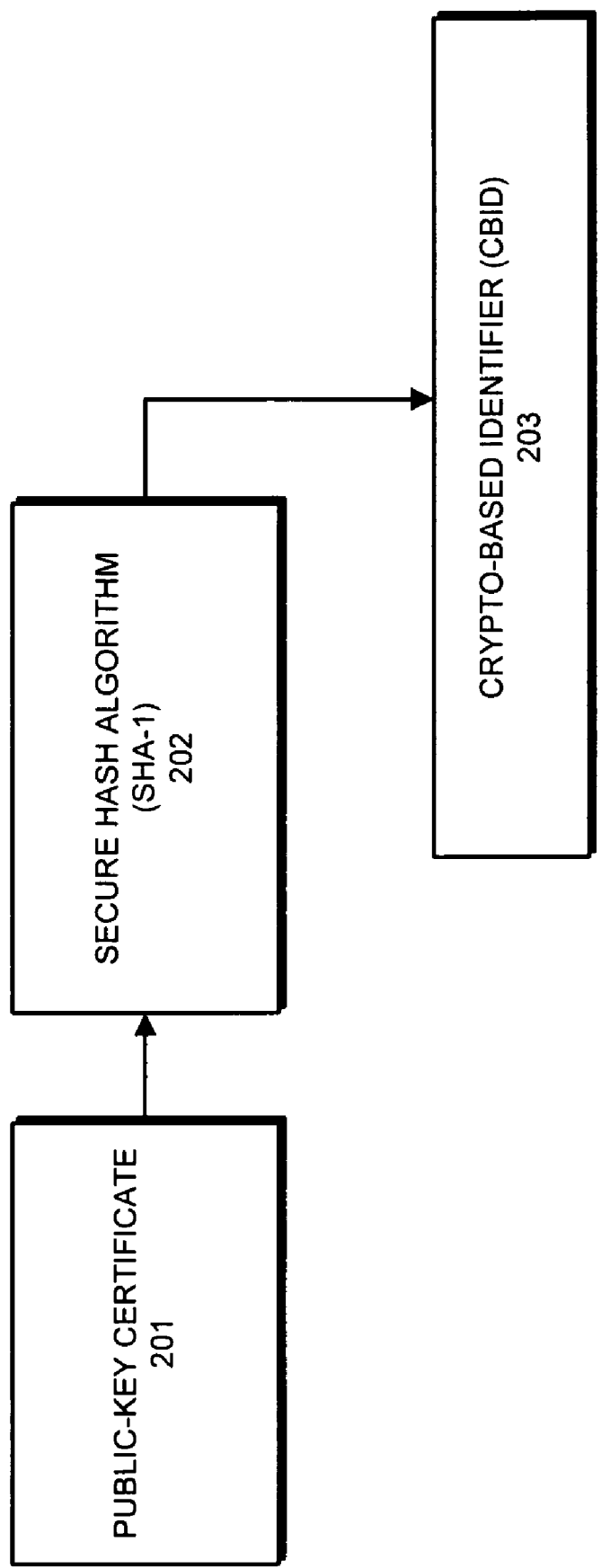
FIG. 2 illustrates how a crypto-based identifier (CBID) can be derived from performing a hash function on a public-key certificate in accordance with an embodiment of the present invention.

FIG. 2 illustrates how a crypto-based identifier (CBID) can be derived from performing a hash function on a public-key certificate in accordance with an embodiment of the present invention. A public-key certificate 201 is fed into a secure hash algorithm (SHA-1) 202. The result of the hash function is then used as a CBID 203, which is 160 bits long.

One embodiment of the present invention distributes CBID 203 across multiple fields in multiple layers of the protocol stack. Another embodiment uses two fields in two layers, but there is nothing preventing one from encapsulating CBID bits in more than two layers.

Each address or identifier in a particular layer that one wishes to use to encapsulate a portion of the CBID can be initialized as follows: the address or identifier contains a truncated sequence of bits of CBID 203, wherein the actual number of included CBID bits is determined by how many bits are available in the corresponding address or identifier of a specific layer (e.g., Media Access (MAC) address, IP address, etc). Thus, portions of a single CBID can be embedded in fields associated with different layers of the OSI reference model.

The hash of public-key certificate 201 can be obtained through a SHA-1 hash function with an output of 160 bits: CBID=SHA-1(PK), wherein PK represents the public-key certificate. If more than 160 bits are desired to be encapsulated in several fields associated with different layers, these bits can be obtained by performing the hash function multiple times to produce multiple sets of 160 bits; whereby the input to the first hash function is the public-key certificate, the input to the second hash function is the public-key certificate concatenated by one "1" bit, the input to the third hash function is the public-key certificate concatenated by two "1" bits, and so on.

The above mechanism constitutes a "CLE" (Cryptographic Layering Enforcement) because a holder of a public key is required to use a number of verifiable identifiers and/or addresses corresponding to different OSI layers. The CBID binds together several vertically stacked (but not necessarily adjacent) layers. Because of the verifiability property of CBID's, and because a CBID is encapsulated across multiple layers, one is able to verify identifiers in multiple layers by checking the portions of CBID in these layers against the hash result of the sending node's public key. Moreover, this verifiability can be used to bootstrap a security association between two nodes, thus protecting a node from man-in-the-middle attacks on a Diffie-Hellman exchange.

Possible applications of CLE are tailored to a given subset of the different OSI layers. Such examples include: IPv6 address (network layer) and Secure Shell (SSH) public-key fingerprint (application layer), IPv6 address and MAC address (data link layer), IPv6 address and Session Initiation Protocol (SIP) Call-ID (application layer), and IPv6 address and JXTA Peer-ID or Group-ID (application layer).

CLE Examples

Figure 3:
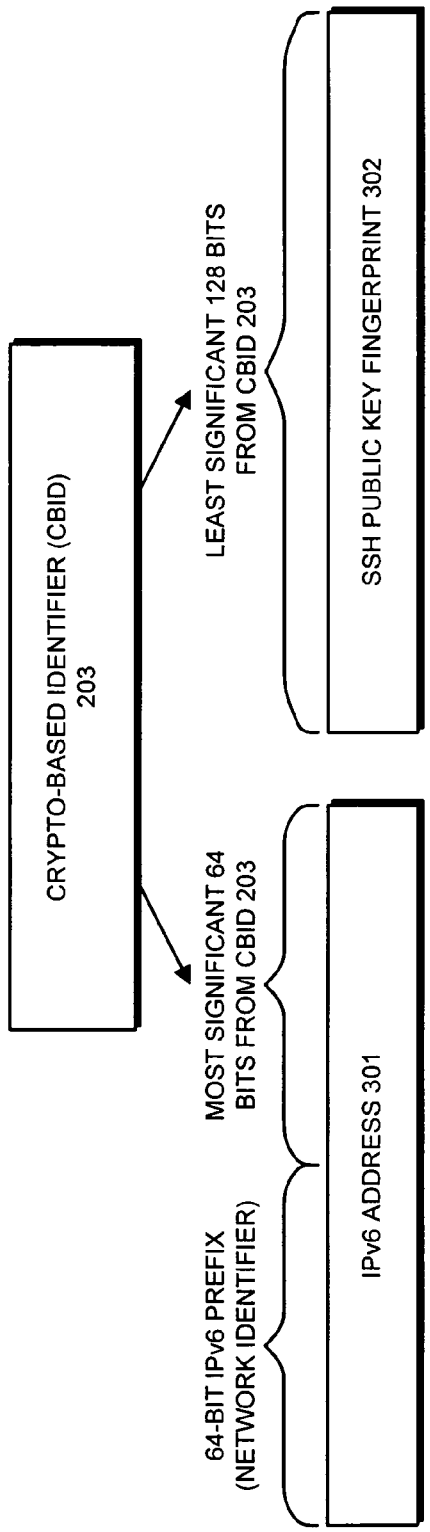
FIG. 3 illustrates how cryptographic layering enforcement (CLE) can be implemented by using a cryptographic IPv6 address and a Secure Shell (SSH) public-key fingerprint that are both derived from a CBID in accordance with an embodiment of the present invention.

FIG. 3 illustrates how CLE can be implemented by using a cryptographic IPv6 address and an SSH public-key fingerprint that are both derived from a CBID. In FIG. 3, cryptographic IPv6 address 301 is comprised of a 64-bit network identifier, followed by the most-significant 64 bits of CBID 203. Note that both the universal/local bit ("u" bit) and the individual/group bit ("g" bit) in the IPv6 address are set to "0" to indicate that this is a cryptographically generated address. This effectively leaves 62 available bits in the IPv6 address to encapsulate a portion of CBID 23.

The other part of CLE, an SSH public-key fingerprint 302, is comprised of the least-significant 128 bits of CBID 203.

Figure 4:
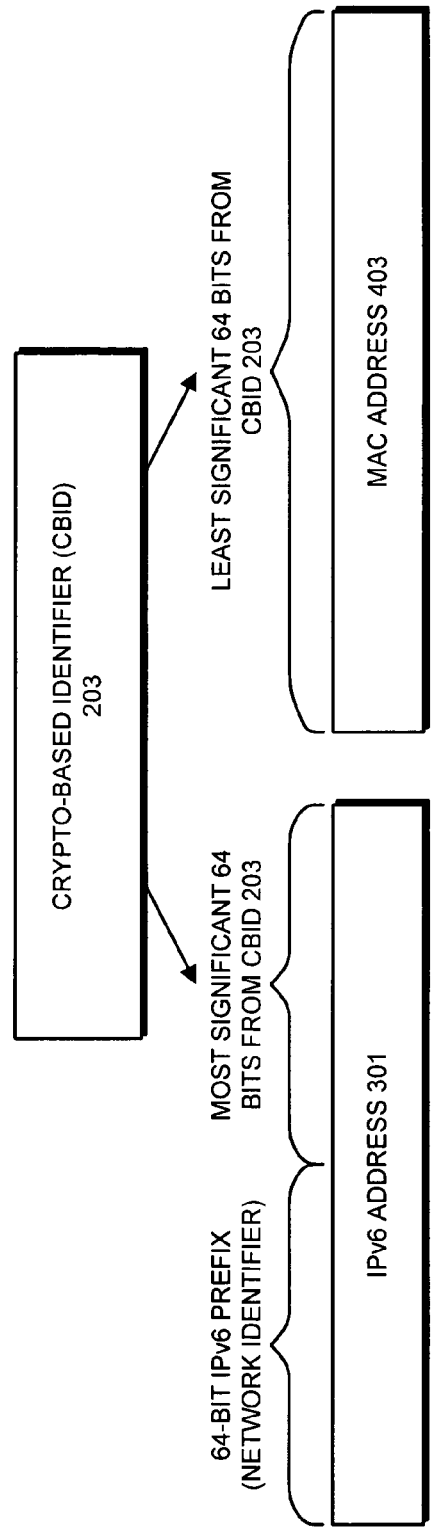
FIG. 4 illustrates how CLE can be implemented by using a cryptographic IPv6 address and a cryptographic MAC address that are both derived from a CBID in accordance with an embodiment of the present invention.

FIG. 4 illustrates how CLE can be implemented by using a cryptographic IPv6 address and a cryptographic MAC address that are both derived from a CBID, wherein a MAC address 403 is comprised of the least significant 64 bits of CBID 203.

Figure 5:
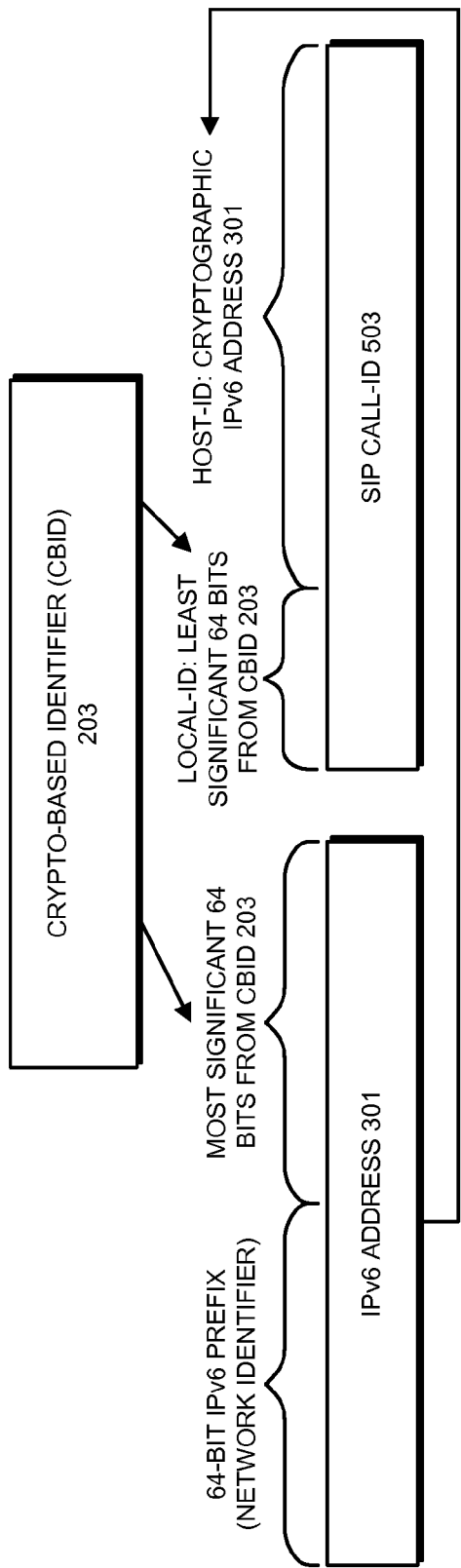
FIG. 5 illustrates how CLE can be implemented by using a cryptographic IPv6 address and a cryptographic Session Initiation Protocol (SIP) Call-ID that are both derived from a CBID in accordance with an embodiment of the present invention.

FIG. 5 illustrates how CLE can be implemented by using a cryptographic IPv6 address and a cryptographic SIP Call-ID that are both derived from a CBID. A SIP Call-ID 503 includes a local-ID, which is comprised of the least significant 64 bits of CBID 203, and a host address, which is the same as IPv6 address 301.

Figure 6:
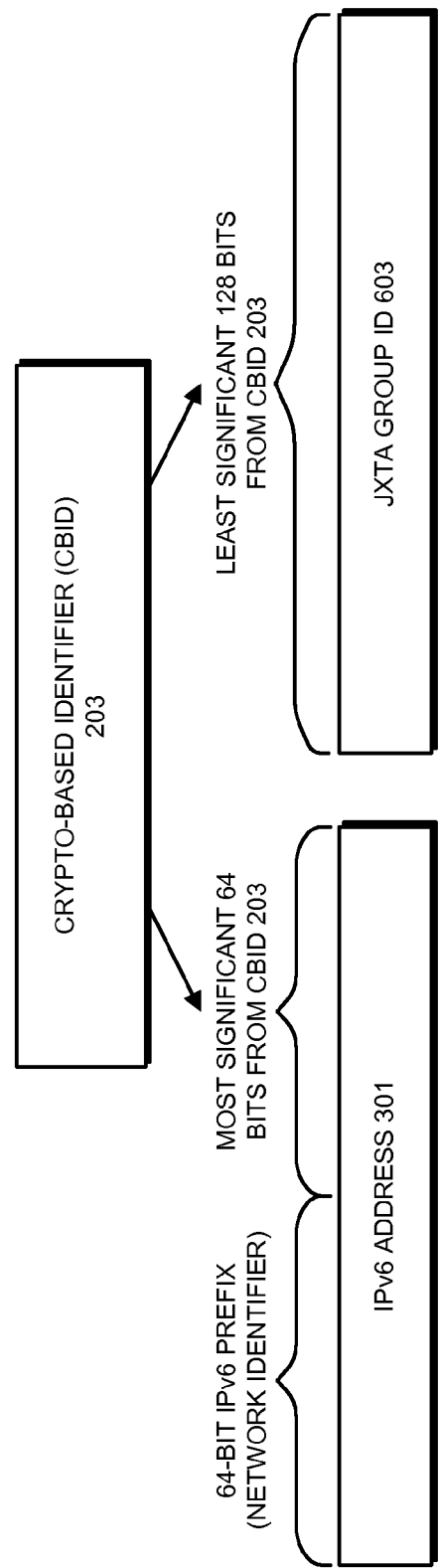
FIG. 6 illustrates how CLE can be implemented by using a cryptographic IPv6 address and a cryptographic JXTA group ID that are both derived from a CBID in accordance with an embodiment of the present invention.

FIG. 6 illustrates how CLE can be implemented by using a cryptographic IPv6 address and a cryptographic JXTA group ID that are both derived from a CBID, wherein a JXTA group ID 603 is comprised of the least significant 128 bits of CBID 203.

Figure 7:
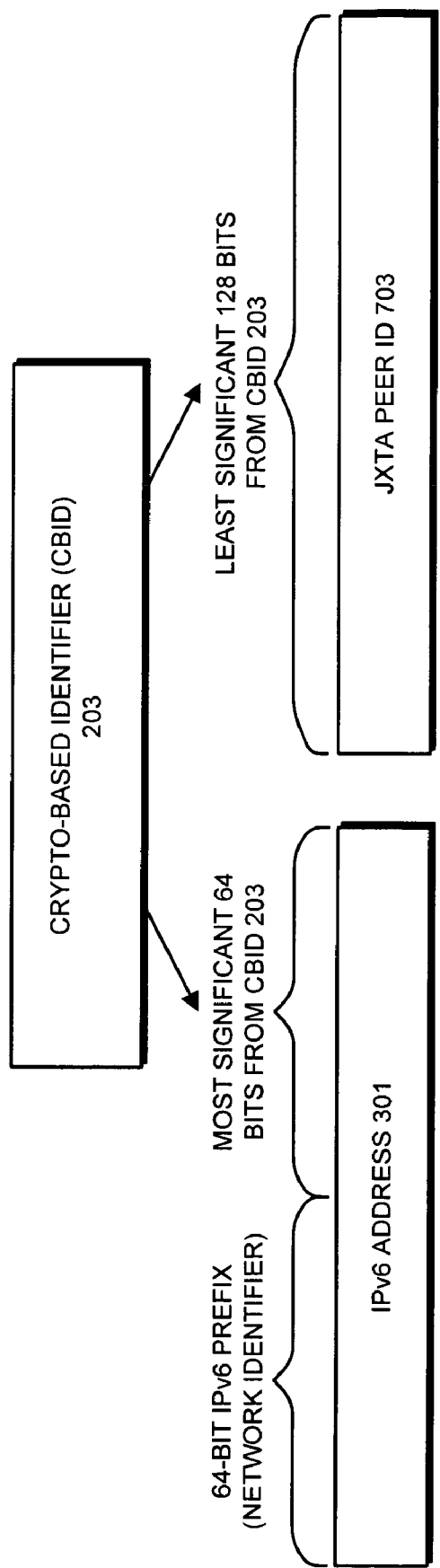
FIG. 7 illustrates how CLE can be implemented by using a cryptographic IPv6 address and a cryptographic JXTA peer ID that are both derived from a CBID in accordance with an embodiment of the present invention.

FIG. 7 illustrates how CLE can be implemented by using a cryptographic IPv6 address and a cryptographic JXTA peer ID that are both derived from a CBID, wherein a JXTA peer ID 703 is comprised of the least significant 128 bits of CBID 203.

Figure 8:
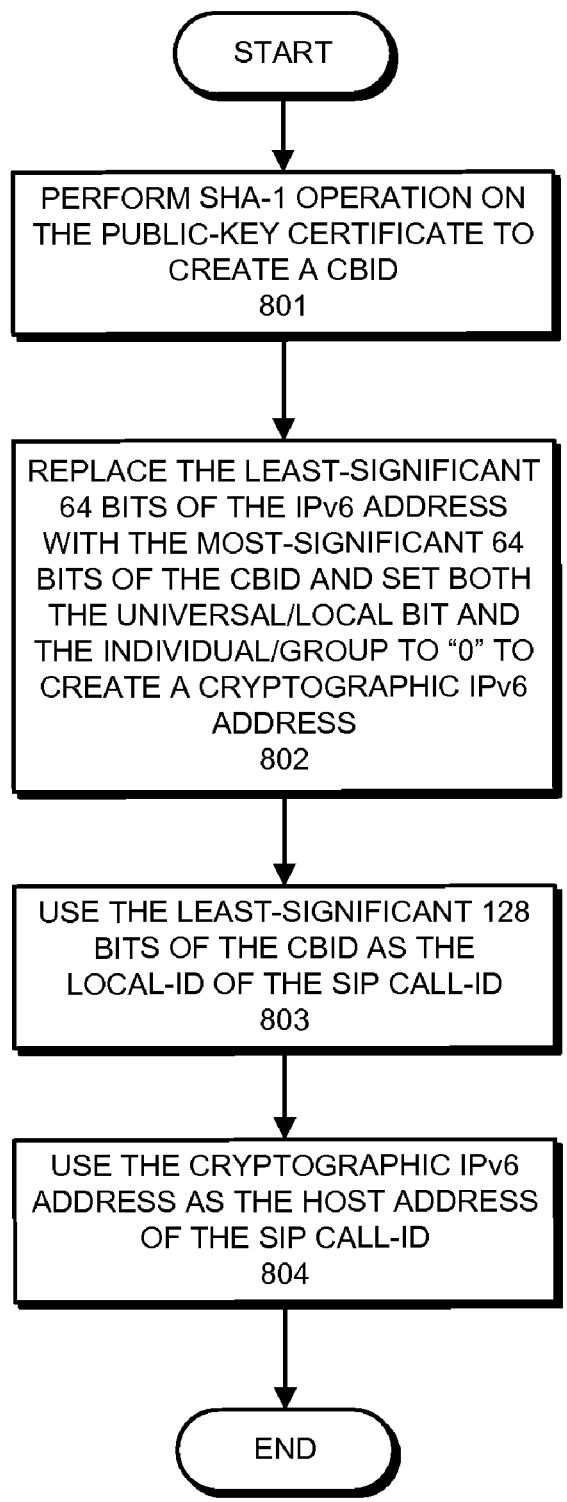
FIG. 8 presents a flow chart illustrating how to construct a cryptographic IPv6 address and a SIP Call-ID from a CBID in accordance with an embodiment of the present invention.

FIG. 8 presents a flow chart illustrating how to construct a cryptographic IPv6 address and a SIP Call-ID from a CBID. The system starts by performing a SHA-1 hash function on the node's public-key certificate in step 801 to obtain a 160-bit CBID. Next, the system replaces the least-significant 64 bits of the node's IPv6 address with the most-significant 64 bits of the CBID (with the "u" bit and "g" bit set to "0") to create a cryptographic IPv6 address (step 802). The system then uses the least-significant 128 bits of the CBID as the SIP local-ID (step 803) and use the cryptographic IPv6 created in step 801 as the SIP host address (step 804).

Figure 9:
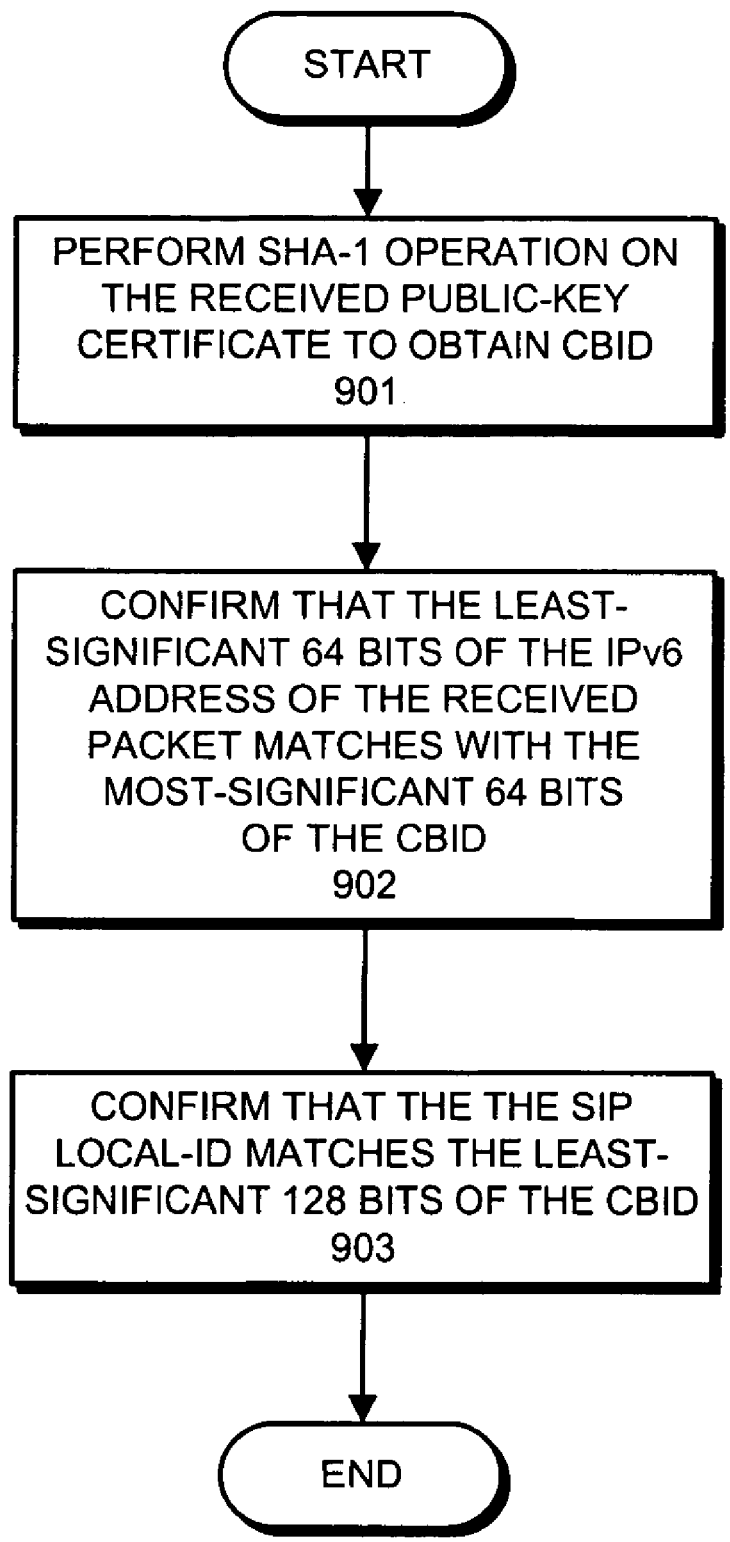
FIG. 9 presents a flow chart illustrating how to verify a packet containing a cryptographic IPv6 address and a SIP Call-ID against a CBID in accordance with an embodiment of the present invention.

FIG. 9 presents a flow chart illustrating how to verify a packet containing a cryptographic IPv6 address and a SIP Call-ID against a CBID. The system starts by performing a SHA-1 hash function on a public-key certificate to obtain a 160-bit CBID, wherein the public-key certificate has been previously obtained from the sender (step 901). Next, the system verifies that the least-significant 64 bits of the IPv6 address of the received packet matches the most-significant 64 bits of the CBID (step 902). The system also confirms that the SIP local-ID matches the least-significant 128 bits of the CBID (step 903).

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for communicating cryptographic data through multiple network layers, comprising:
   receiving the cryptographic data at a node;
   dividing the cryptographic data into multiple pieces; and
   simultaneously encapsulating different pieces of the cryptographic data in fields associated with different network layers of a protocol stack in a data packet, wherein the cryptographic data is larger than a single field, and wherein the cryptographic data is encapsulated within multiple fields associated with different network layers of the protocol stack;
   wherein the multiple fields are received simultaneously by a receiving node that reconstructs an identity associated with the cryptographic data; and
   wherein the multiple fields are encapsulated simultaneously into the data packet to ensure that the data packet can be routed through a network to reach the receiving node.

2. The method of claim 1, wherein receiving the cryptographic data involves performing at least one non-reversible function on a piece of input data to produce the cryptographic data.

3. The method of claim 2, wherein the input data includes a public key associated with the node.

4. The method of claim 2, wherein the input data includes a static identifier associated with the node.

5. The method of claim 2, wherein an IPv6 address field of the data packet is comprised of a 64-bit prefix followed by the most-significant 64 bits of the output of the non-reversible function, and wherein a universal/local bit and an individual/group bit of the IPv6 address are both set to "0".

6. The method of claim 5, wherein a SIP Call-ID field of the data packet is comprised of a local-id and a host address, wherein
   the local-id is comprised of the least-significant 128 bits of the output of the non-reversible function; and wherein
   the host address is comprised of the IPv6 address.

7. The method of claim 2, wherein an SSH public-key fingerprint field of the data packet is comprised of the least-significant 128 bits of the output of the non-reversible function.

8. The method of claim 2, wherein a MAC address field of the data packet is comprised of the least-significant 64 bits of the output of the non-reversible function.

9. The method of claim 2, wherein a JXTA Peer-ID field of the data packet is comprised of the least-significant 128 bits of the output of the non-reversible function.

10. The method of claim 2, wherein a JXTA Group-ID field of the data packet is comprised of the least-significant 128 bits of the output of the non-reversible function.

11. An apparatus for communicating cryptographic data through multiple network layers, comprising:
    a receiving mechanism configured to receive the cryptographic data at a node;
    a dividing mechanism configured to divide the cryptographic data into multiple pieces; and
    an encapsulation mechanism configured to simultaneously encapsulate different pieces of the cryptographic data in fields associated with different network layers of a protocol stack in a data packet, wherein the cryptographic data is larger than a single field, and wherein the cryptographic data is encapsulated within multiple fields associated with different network layers of the protocol stack
    wherein the multiple fields are received simultaneously by a receiving node that reconstructs an identity associated with the cryptographic data; and
    wherein the multiple fields are encapsulated simultaneously into the data packet to ensure that the data packet can be routed through a network to reach the receiving node.

12. The apparatus of claim 11, wherein the receiving mechanism is configured to perform at least one non-reversible function on a piece of input data to produce the cryptographic data.

13. The apparatus of claim 12, wherein the input data includes a public key associated with the node.

14. The apparatus of claim 12, wherein the input data includes a static identifier associated with the node.

15. The apparatus of claim 12, wherein an IPv6 address field of the data packet is comprised of a 64-bit prefix followed by the most-significant 64 bits of the output of the non-reversible function, and wherein a universal/local bit and an individual/group bit of the IPv6 address are both set to "0".

16. The apparatus of claim 15, wherein a SIP Call-ID field of the data packet is comprised of a local-id and a host address, wherein
the local-id is comprised of the least-significant 128 bits of the output of the non-reversible function; and wherein
the host address is comprised of the IPv6 address.

17. The apparatus of claim 12, wherein an SSH public-key fingerprint field of the data packet is comprised of the least-significant 128 bits of the output of the non-reversible function.

18. The apparatus of claim 12, wherein a MAC address field of the data packet is comprised of the least-significant 64 bits of the output of the non-reversible function.

19. The apparatus of claim 12, wherein a JXTA Peer-ID field of the data packet is comprised of the least-significant 128 bits of the output of the non-reversible function.

20. The apparatus of claim 12, wherein a JXTA Group-ID field of the data packet is comprised of the least-significant 128 bits of the output of the non-reversible function.

21. A computer system for communicating cryptographic data through multiple network layers, comprising:
a central processing unit;
a semiconductor memory;
a receiving mechanism configured to receive the cryptographic data at a node;
a dividing mechanism configured to divide the cryptographic data into multiple pieces; and
an encapsulation mechanism configured to simultaneously encapsulate different pieces of the cryptographic data in fields associated with different network layers of a protocol stack in a data packet, wherein the cryptographic data is larger than a single field, and wherein the cryptographic data is encapsulated within multiple fields associated with different network layers of the protocol stack;
wherein the multiple fields are received simultaneously by a receiving node that reconstructs an identity associated with the cryptographic data; and
wherein the multiple fields are encapsulated simultaneously into the data packet to ensure that the data packet can be routed through a network to reach the receiving node.

22. The computer system of claim 21, wherein the receiving mechanism is configured to perform at least one non-reversible function on a piece of input data to produce the cryptographic data.

23. The computer system of claim 22, wherein the input data includes a public key associated with the node.

24. The computer system of claim 22, wherein the input data includes a static identifier associated with the node.

25. The computer system of claim 22, wherein an IPv6 address field of the data packet is comprised of a 64-bit prefix followed by the most-significant 64 bits of the output of the non-reversible function, and wherein a universal/local bit and an individual/group bit of the IPv6 address are both set to "0".

26. The computer system of claim 25, wherein a SIP Call-ID field of the data packet is comprised of a local-id and a host address, wherein
the local-id is comprised of the least-significant 128 bits of the output of the non-reversible function; and wherein
the host address is comprised of the IPv6 address.

27. The computer system of claim 22, wherein an SSH public-key fingerprint field of the data packet is comprised of the least-significant 128 bits of the output of the non-reversible function.

28. The computer system of claim 22, wherein a MAC address field of the data packet is comprised of the least-significant 64 bits of the output of the non-reversible function.

29. The computer system of claim 22, wherein a JXTA Peer-ID field of the data packet is comprised of the least-significant 128 bits of the output of the non-reversible function.

30. The computer system of claim 22, wherein a JXTA Group-ID field of the data packet is comprised of the least-significant 128 bits of the output of the non-reversible function.

31. A method for verifying a data packet containing cryptographic data, comprising:
receiving the data packet;
extracting pieces of cryptographic data from fields associated with different network layers of a protocol stack within the data packet, wherein the cryptographic data is larger than a single field, and wherein the cryptographic data is simultaneously encapsulated within multiple fields; and
verifying that each piece of extracted cryptographic data matches with a corresponding portion of a piece of previously obtained cryptographic data;
wherein the multiple fields are received simultaneously to reconstruct an identity associated with the cryptographic data; and
wherein the multiple fields are simultaneously encapsulated into the data packet by a sending node to ensure that the data packet can be routed through a network to reach a receiving node.

32. The method of claim 31, wherein the previously obtained cryptographic data is obtained through a process that involves performing at least one non-reversible function on a piece of input data to produce the cryptographic data.

33. An apparatus for verifying a data packet containing cryptographic data, comprising:
a receiving mechanism configured to receive the data packet;
an extracting mechanism configured to extract pieces of cryptographic data from fields associated with different network layers of a protocol stack within the data packet, wherein the cryptographic data is larger than a single field, and wherein the cryptographic data is simultaneously encapsulated within multiple fields; and
a verification mechanism configured to verify that each piece of extracted cryptographic data matches with a corresponding portion of a piece of previously obtain cryptographic data.

34. The apparatus of claim 33, wherein the previously obtained cryptographic data is obtained through a process that involves performing at least one non-reversible function on a piece of input data to produce the cryptographic data.

35. A computer system for verifying a data packet containing cryptographic data, comprising:
a central processing unit;
a semiconductor memory;
a receiving mechanism configured to receive the data packet;
an extracting mechanism configured to extract pieces of cryptographic data from fields associated with different network layers of a protocol stack within the data packet, wherein the cryptographic data is larger than a single field, and wherein the cryptographic data is simultaneously encapsulated within multiple fields; and a verification mechanism configured to confirm that each piece of extracted cryptographic data matches with a corresponding portion of a piece of previously obtained cryptographic data;

wherein the multiple fields are received simultaneously to reconstruct an identity associated with the cryptographic data; and wherein the multiple fields are simultaneously encapsulated into the data packet by a sending node to ensure that the data packet can be routed through a network to reach the receiving mechanism.

36. The computer system of claim 35, wherein the previously obtained cryptographic data is obtained through a process that involves performing at least one non-reversible function on a piece of input data to produce the cryptographic data.

* * * * *

UNITED STATES PATENT AND TRADEMARK OFFICE
CERTIFICATE OF CORRECTION

| | | |
|---|---|---|
| PATENT NO. | : 7,401,215 B2 | Page 1 of 1 |
| APPLICATION NO. | : 10/674938 | |
| DATED | : July 15, 2008 | |
| INVENTOR(S) | : Gabriel E. Montenegro et al. | |

It is certified that error appears in the above-identified patent and that said Letters Patent is hereby corrected as shown below:

In claim 33 (at column 8, line 54), please delete the word, "obtain" and insert the word --obtained-- so the line reads --corresponding portion of a piece of previously obtained--.

Signed and Sealed this

Seventh Day of October, 2008

JON W. DUDAS
*Director of the United States Patent and Trademark Office*